UNITED STATES PATENT OFFICE.

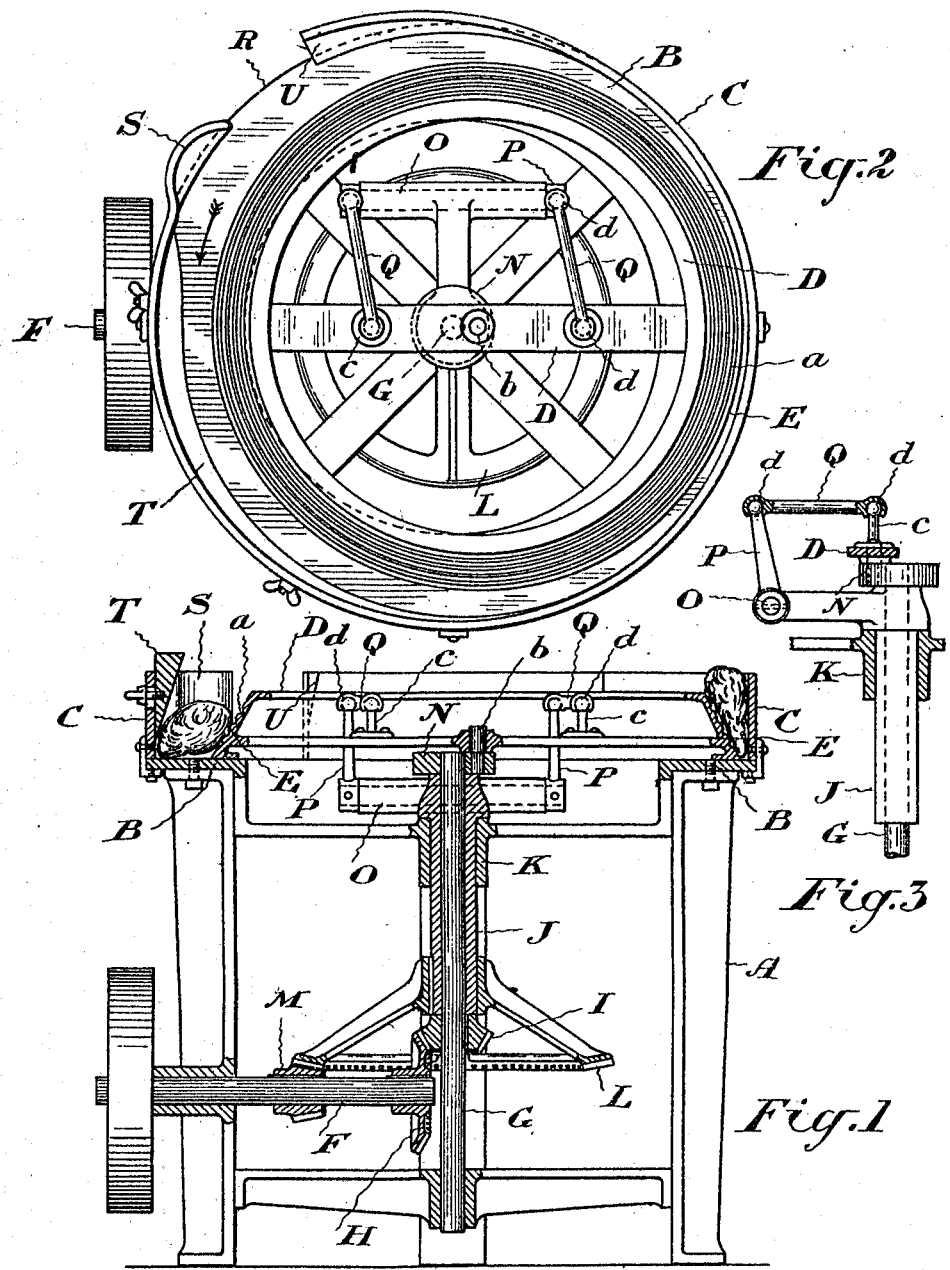

ROBERT J. F. ALDRED AND ALFRED E. ALDRED, OF GLENCOE, ONTARIO, CANADA.

DOUGH-HANDING MACHINE.

993,138.  Specification of Letters Patent.  Patented May 23, 1911.

Application filed February 7, 1910. Serial No. 542,604.

*To all whom it may concern:*

Be it known that we, ROBERT J. F. ALDRED and ALFRED E. ALDRED, of the town of Glencoe, in the Province of Ontario, Canada, have invented certain new and useful Improvements in Dough-Handing Machines, of which the following is a specification.

This invention relates to means for imitating by machinery the action of the human hands in kneading dough and which operation when performed by hand or machinery is generally known as "handing", and our object is to devise a rotary machine for this purpose through which the divided portions of dough may be passed and subjected to a combined rolling and kneading action during its passage which gives them the consistency of skin desired by bakers.

We attain our object by supporting within a pan a circular disk of less diameter than the pan so that an annular space is left between the disk and the rim of the pan through which the dough is passed. This disk is vibrated in the plane of the pan and at the same time is rotated, thereby rapidly punching the dough and at the same time rolling it around the pan to a suitable outlet.

Figure 1 is a vertical section of a dough hander constructed in accordance with our invention. Fig. 2 is a plan view of the same, and Fig. 3 is a side elevation of the connecting means for rotating the disk of the machine.

A is a frame of the machine, suitably shaped to support the different parts. On top of this frame is supported a pan B of which C is the rim. As only the outer portions of the pan are used the center is cut out leaving it of an annular form. Within this pan is located the disk D, the outer rim E of which is preferably beveled inwardly and upwardly from the lower edge and is also preferably provided with circumferential corrugations a. This disk preferably rests on or lies in close contact with the bottom of the pan B. As the disk is less in external diameter than the internal diameter of the rim of the pan an annular space or trough is formed to receive the divided portions of dough. The dough is carried around this annular space or trough by a rotary movement of the disk, which is imparted thereto in a manner we will shortly describe. At the same time a rapid vibratory movement is imparted to the disk in the plane of the pan. These movements are imparted thereto by the following mechanism. F is a driving shaft suitably journaled on the frame of the machine. G is a vertical shaft centrally journaled on the frame of the machine. A bevel gear wheel H on the shaft F meshes with a bevel pinion I on the shaft G, which is thus given a rapid movement of rotation relative to the shaft F. About the shaft G is journaled a sleeve J, the upper part of which is journaled in the bearing K, which thus constitutes a bearing for the upper ends of both the shaft G and the sleeve J. On the sleeve is secured a bevel gear wheel L meshing with the bevel pinion M on the shaft F. The sleeve is thus given a slow movement relative to the shaft F. On the upper end of the shaft F is secured the crank disk N carrying the wrist pin *b* journaled centrally in the disk D. The rotation of the vertical shaft thus tends to impart a rapid vibratory movement to the disk. On the sleeve J is suitably journaled the transverse spindle O, to the ends of which are secured the upwardly extending arms P. The upper ends of these arms P are connected with pins *c* on the disk D by means of the links Q. These links are given a swiveled connection at their ends with the arms P and the pins *c*, preferably by means of ball and socket joints *d* as shown. This form of connection is necessitated, of course, by the fact that the disk is being vibrated rapidly while at the same time through the medium of the spindle O, the arms P and links Q it is being rotated about the vertical axis of the sleeve J. The dough is thus moved around the pan and at the same time punched by the disk in manner to resemble the kneading of dough by hand.

At R we show a portion of the rim of the pan cut away. This forms the exit for the handed dough. Adjacent thereto at S the rim of the pan is preferably flared a little to facilitate the dropping of the pieces of the dough into the machine.

At the ingoing side of the entrance for dough the rim of the pan is preferably inclined inwardly, the incline dying out at about half the circumference of the pan. This tends to give the dough extra pressure for removing the gases immediately after its entrance into the machine. Near the exit the rim of the pan is flared as shown at U to cause the dough to be formed up into a round ball. This inward inclination of the rim of the pan is preferably given by bolting in place the separate piece T and by bolts *f* passing through slots in the rim. The piece T is thus made vertically adjustable to vary the pressure on the dough as circumstances may require.

From the above description it will be seen that the whole machine is very simple and that the dough is satisfactorily handled in the desired manner.

What we claim as our invention is:—

1. In a dough hander the combination of a pan; a disk of less diameter than the pan and supported therein; a vertical shaft; a crank at the upper end of the shaft provided with a crank pin journaled in the disk; a rotating part and flexible connections between said rotating part and the disk for rotating the latter.

2. In a dough hander the combination of a pan; a disk of less diameter than the pan and supported therein; a vertical shaft; a crank at the upper end of the shaft provided with a crank pin journaled in the disk; a sleeve rotatable on said shaft; a spindle journaled transversely on said sleeve; arms extending from said spindle and links swiveled on said arms and on the disk.

3. In a dough hander the combination of a pan; a disk of less diameter than the pan and supported therein, the rim of the disk being exteriorly corrugated and beveled inwardly from the bottom toward the top, the rim of the pan being provided with an outlet opening; a beveled piece for imparting an inward inclination to the rim secured to the said rim adjacent to the ingoing side of the outlet opening and vertically adjustable to said rim; means for rotating said disk; and means for simultaneously vibrating the disk in the plane of the pan.

Glencoe, Ont., this 31st day of January 1910.

ROBERT J. F. ALDRED.
ALFRED E. ALDRED.

Signed in the presence of—
W. D. Moss,
LILA HURLEY.